US012627488B2

(12) United States Patent
Kim et al.

(10) Patent No.: US 12,627,488 B2
(45) Date of Patent: *May 12, 2026

(54) HANDLING OF DATABASE ENCRYPTION KEY REVOCATION

(71) Applicant: SAP SE, Walldorf (DE)

(72) Inventors: Beomsoo Kim, Seoul (KR); Yong Sik Kwon, Seoul (KR); Ji Hoon Jang, Seoul (KR); Hyeong Seog Kim, Seoul (KR)

(73) Assignee: SAP SE, Walldorf (DE)

( * ) Notice: Subject to any disclaimer, the term of this patent is extended or adjusted under 35 U.S.C. 154(b) by 197 days.

This patent is subject to a terminal disclaimer.

(21) Appl. No.: 18/065,048

(22) Filed: Dec. 13, 2022

(65) Prior Publication Data

US 2024/0195617 A1    Jun. 13, 2024

(51) Int. Cl.
*H04L 9/08*      (2006.01)
*G06F 21/60*      (2013.01)
*G06F 21/62*      (2013.01)

(52) U.S. Cl.
CPC .......... *H04L 9/0891* (2013.01); *G06F 21/602* (2013.01); *G06F 21/6218* (2013.01)

(58) Field of Classification Search
CPC ... H04L 9/0891; G06F 21/602; G06F 21/6218
See application file for complete search history.

(56) References Cited

U.S. PATENT DOCUMENTS

| | | | | |
|---|---|---|---|---|
| 8,639,625 B1 * | 1/2014 | Ginter | .................... | G06F 21/78 |
| | | | | 705/50 |
| 11,736,482 B2 * | 8/2023 | Hall | ................... | H04L 63/0838 |
| 2020/0259896 A1 * | 8/2020 | Sachs | ................ | H04W 56/0065 |
| 2020/0301787 A1 * | 9/2020 | Cabral | ................ | G06F 11/1469 |
| 2022/0266446 A1 * | 8/2022 | Cristache | ................ | G06N 5/04 |
| 2022/0382915 A1 | 12/2022 | Thomsen | | |
| 2024/0160582 A1 * | 5/2024 | Gonabal | ............... | H04L 9/3247 |

OTHER PUBLICATIONS

Communication: "Extended European Search Report", Apr. 3, 2024 (Apr. 3, 2024), European Patent Office, for European Application No. 23180668.8-1203, 11 pages.

(Continued)

*Primary Examiner* — Linglan Edwards
*Assistant Examiner* — Kamryn J Gillespie
(74) *Attorney, Agent, or Firm* — Buckley, Maschoff & Talwalkar LLC

(57)          ABSTRACT

Systems and methods include storage of a plurality of encrypted data pages of a row store database table in a persistent storage system, determination of a first encryption key associated with one of the plurality of encrypted data pages based on a header of the one of the plurality of encrypted data pages, determination of whether the first encryption key has been revoked, and, if it is determined that the first encryption key has been revoked, adding of a portion of volatile memory allocated to the one of the plurality of data pages to a free list.

17 Claims, 7 Drawing Sheets

(56) References Cited

OTHER PUBLICATIONS

Wu, Yuming et al., "Comprehensive VM Protection against Untrusted Hypervisor through Retrofitted AMD Memory Encryption", 2018 IEEE International Symposium on High Performance Computer Architecture, Feb. 24, 2018 (Feb. 24, 2018), XP033341999, DOI 10.1 109/HPCA.2018.00045, retrieved on Mar. 27, 2018], (pp. 441-453, 13 total pages).

Communication: "European Examination Report", Mar. 20, 2026, European Patent Office, for European Application No. 23180668. 8-1203, 11 pages.

N.N: "Garbage collection (computer science)", Wikipedia, Dec. 2, 2022 (Dec. 2, 2022), pp. 1-10, XP093376149, Internet Retrieved from the Internet:URL:https://en.wikipedia.org/w/index.php?title= Garbage_collection_(computer_science)&oldid=1125070120.

\* cited by examiner 400
(cont.)

HANDLING OF DATABASE ENCRYPTION KEY REVOCATION

BACKGROUND

Multi-tenancy is a software architecture pattern which facilitates the sharing of computing resources among disparate groups of users. For example, a single multi-tenant application (e.g., a Software-as-a-Service (SaaS) application) may serve multiple end user groups (i.e., customers) within a single software instance. Such a software instance uses a much smaller computing resource footprint than would be required to provision one software instance per customer. Multi-tenancy can therefore provide substantial cost benefits.

The data of each customer in a multi-tenant architecture is typically mapped to a corresponding tenant in the underlying data layer. This mapping allows for logical separation of the data within the data layer and facilitates access thereto by the multi-tenant application. In some multi-tenant architectures, the data of each tenant is managed by a different database instance executing within a same computing system (e.g., a rack server). These architectures provide excellent separation of tenant data but it may be cost-inefficient in some scenarios to require a full database instance per tenant. For example, a smallest database instance may consume 32 Gb of memory, which may represent significantly more computing resources than should be required by a small tenant.

Other multi-tenant data architectures use a single database instance to manage the data of multiple tenants. Since the data in such an architecture is not physically separated, the multi-tenant application is responsible for storing and managing the data in a tenant-aware manner. For example, a database system may use one schema of a single instance for all tenants, where the data of each tenant is partitioned via a discriminating column. The multi-tenant application uses the values of the discriminating column to identify the data belonging to specific tenants. In another example, the multi-tenant application associates a dedicated schema to each tenant. In either case, the database system is unaware of the existence of the multiple tenants and operates in the same manner as if it were being accessed by a single-tenant application.

Data volumes and log segments of a database system may be persisted to disk. This data, which includes all the customer (i.e., tenant) data stored in the database system as well as data and metadata not specific to any customer, is conventionally encrypted using a key associated with the database system (i.e., a symmetric data encryption key) prior to storage thereof on disk. The data encryption key is generated by a provider of the database system is stored local to the database. Recent systems provide such database-instance-level encryption features on a tenant-level, where the data of each database tenant is encrypted with its own tenant-specific key.

On restart or restoration from a backup, persisted data on the disk is decrypted using appropriate tenant-specific keys and loaded into memory. However, if one or more required tenant-specific keys are no longer available (e.g., due to revocation or other phenomena), the persisted data associated with those keys cannot be decrypted and is unusable by the database.

DETAILED DESCRIPTION

Figure 1:
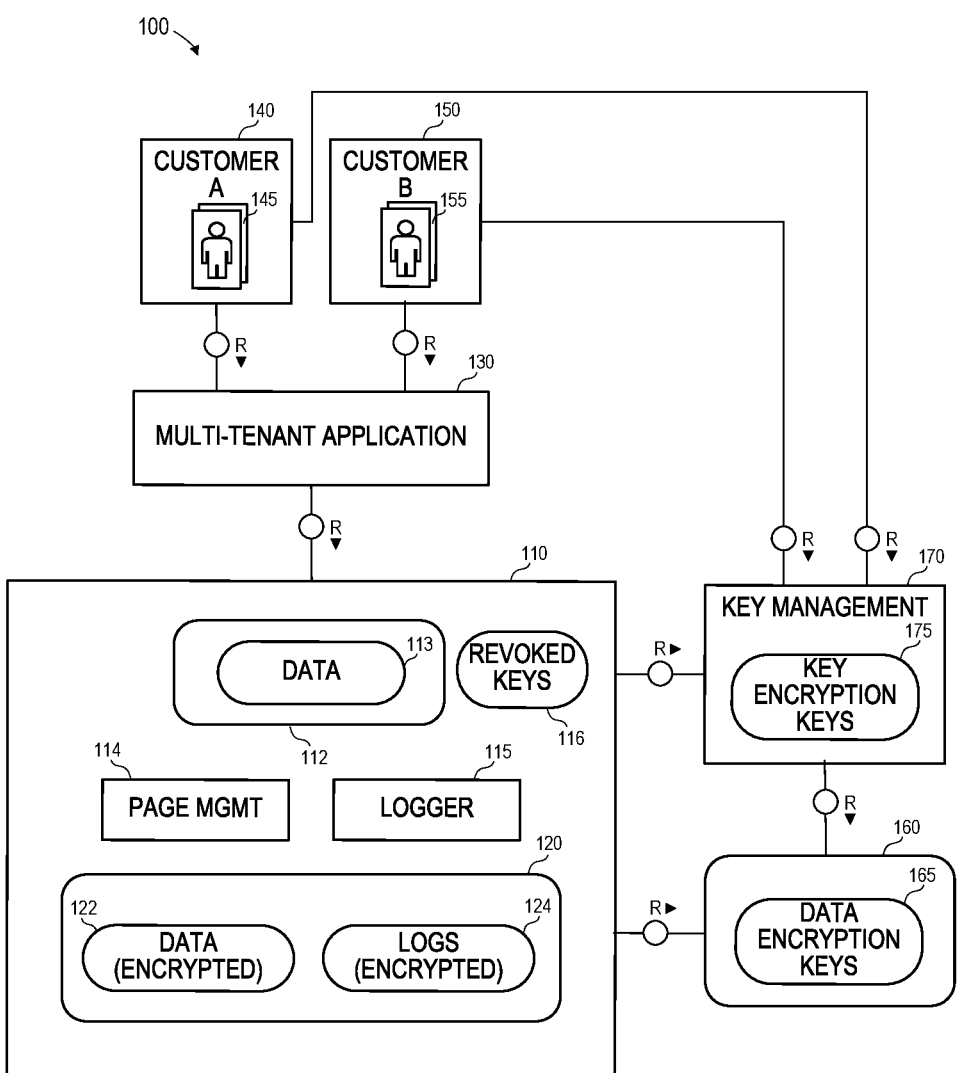
FIG. 1 is a block diagram of a database system providing handling of tenant-specific key revocation within a multi-tenant database according to some embodiments.

The following description is provided to enable any person in the art to make and use the described embodiments. Various modifications, however, will be readily-apparent to those in the art.

Generally, all database system data not actively being processed (i.e., data "at rest") resides encrypted in persistent storage, where the data of each database tenant is encrypted with its own tenant-specific symmetric key. Data and metadata which is shared by all tenants (e.g., database catalog, users, shared containers) may be encrypted in persistent storage using a database instance-specific symmetric key.

Such encryption may prevent data leakage and provide defense in case of a third-party breach. The keys may be customer-supplied and can be controlled (i.e., revoked) to prevent the database provider from accessing customer data. In a multi-tenant scenario, where the database system may include data of two or more customers, revocation of a key by a particular customer only renders the data of that particular customer inaccessible. Such customer control may decrease potential liability of the database provider if confidential customer data becomes public and the source of data leakage cannot be identified.

According to some embodiments, the header of each data page of a row store database table includes an identifier of a tenant with which the row store database table is associated. Prior to storing the data page in persistent storage, the identifier is used to determine a key and the key is used to encrypt the body (and not the header) of the data page. The data page, consisting of an unencrypted header and an encrypted body, is then stored in the persistent storage. In some embodiments the header is also encrypted, but using the database instance-specific key as opposed to the tenant-specific key.

In order to load the data page from persistent storage into memory, for example, at a database restart, the header of the stored data page is read to determine a corresponding key. The key is used to decrypt the body of the data page. The data page, now consisting of the header and the unencrypted body, may then be loaded into memory.

However, if the tenant-specific key is not available at restart (e.g., because it has been revoked by a customer), then the page cannot be decrypted. Rather, the page may be added to a free list of available memory pages. Assuming that the page holds data of a table assigned to the tenant associated with the unavailable key, then all other pages of the table will be freed at restart rather than being decrypted (which is now not possible) and loaded into memory.

Also during restart, redo log entries for which keys are not available are not replayed and undo pages of uncommitted transactions are not rolled back. Once a tenant-specific key has been revoked, the associated data are unrecoverable from the persistence. If a customer decides to undo the key revocation, the associated data must be restored from a backup.

According to some embodiments, a native multi-tenant database system includes a database-level tenant object (e.g., a database catalog object) which facilitates the implementation of multi-tenant architectures on the application layer. A tenant object is a logical collection of data as well as metadata artifacts which have been assigned to a tenant. Tenants may be exposed as first-class database objects (i.e., having an identity independent of any other database entity).

The database artifacts assigned to a particular instantiation of a tenant object (i.e., a particular tenant) may include, but are not limited to, data of one or more schemas, tables, and partitions, as well as metadata defining views on the tenant's tables, virtual tables, caches, remote sources, workload classes used to govern resource usage for the tenant's database objects, and database users. Advantageously, the lifecycle of a tenant may be decoupled from the lifecycle of its assigned database artifacts. However, in some embodiments, dropping of a tenant from a database instance results in dropping of artifacts assigned thereto, so long as those artifacts are not assigned to another tenant of the database instance.

A native multi-tenant database system may include one or more database instances, the data of all tenants, and the engines for processing the data. The single system also includes a single persistence for the data of all the tenants. By allowing multiple, independent tenants, or rather customers, to be hosted on a single instance and share computing resources, deployment of a new tenant to a database instance is associated with a near-zero marginal cost. The latter comes at a cost of lower physical isolation between the different tenants. Moreover, embodiments enable a pay-per-use model having a finer granularity than that required for provisioning a separate database instance.

A database system according to some embodiments supports requests for tenant-level database operations which would otherwise need to be implemented by the application. These operations may include tenant creation, tenant drop, tenant move, tenant restore from backup, tenant clone, tenant resize and tenant resource limitation. In some embodiments, a shared service exposes APIs (e.g., via REST) which are called by multi-tenant applications to request these tenant-level operations from the database system using, for example, an associated tenant id. Current database system DDLs may be extended to support the assignment of database artefacts to tenants.

FIG. 1 is a block diagram of system 100 according to some embodiments. The illustrated elements of system 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/or any other metric.

Database instance 110 provides native multi-tenancy according to some embodiments. Database instance 110 may be provisioned on any suitable combination of hardware and software, including one or more computer servers or virtual machines. In some embodiments, database instance 110 comprises a containerized application executing within a software container. Such containers may be implemented by one or more nodes of a cluster (e.g., a Kubernetes cluster) as is known in the art.

Each tenant of system 100 will be described as corresponding to a customer, where a customer may be a company, a division, a workgroup, or any other group of users. A tenant may correspond to a particular cloud resource/service subscription of a given customer. In this regard, a customer may be associated with more than one subscription and therefore more than one tenant.

Database instance 110 includes volatile (e.g., Random Access) memory 112. Memory 112 includes data 113 which includes row store tables, column store tables, and system tables. The system tables may store metadata defining a database catalog, users, etc.

Figure 2:
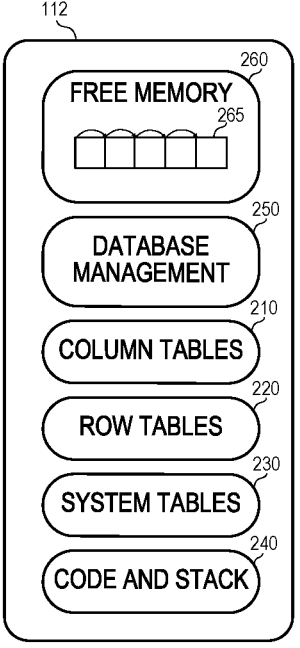
FIG. 2 is a block diagram of database memory portions according to some embodiments.

FIG. 2 is a block diagram illustrating components of memory 112 according to some embodiments. Column tables 210, row tables 220 and system tables 230 are included within data 113 as described above. As is known in the art, the data of each row of a row store table is stored in contiguous memory locations of memory 112, and the data of columns of column store tables is stored in contiguous memory locations of memory 112. Memory 112 also stores program code and stack 240, and memory 250 required for temporary computations and database management.

Memory 112 also includes pool of free memory 260 usable by database instance 110. When memory is required to increase the size of a table growth or for temporary computations, the required memory is obtained from free memory 260. Once a temporary computation completes or a table is dropped (e.g., due to revocation of a corresponding tenant decryption key), the resulting freed memory is returned to free memory 260.

A portion of free memory 260 may comprise free list 265. Free list 265 is a linked list of unallocated regions of memory. For example, the first word of each region of memory in list 265 may point to a next region in list 265.

Each region of memory in free list 265 may be a fixed size equal to the size of a database page (e.g., 16 kB). To free a memory region associated with a particular database page, the memory region is linked to free list 265. To allocate a region of memory for use as a database page, the last region of free list 265 is removed therefrom and used.

Data of each row store table 220 is stored as a set of linked logical pages. As is known in the art, each page includes a header and a body. The header includes page metadata such as, for example, a logical page number and pointers to a preceding page and to a next logical page. The body includes actual data of the row store table which is associated with the page.

Data 113 includes multiple instances of a tenant object defined in the metadata. Each tenant instance is a collection of database artifacts, where the artifacts assigned to each tenant instance are stored within data 113. The database artifacts assigned to a tenant instance may include, for example, one or more schemas, tables, and partitions. The database artifacts may also include metadata defining views on the tenant's tables, virtual tables, caches, remote sources, workload classes used to govern resource usage for the tenant's database objects, and database users.

Multi-tenant application 130 may comprise a SaaS application but embodiments are not limited thereto. Multi-tenant application 130 may be provisioned on one or more computer servers or virtual machines and may comprise a containerized application executing within a software container. Multi-tenant application 130 issues queries (e.g., SQL, MDX) to database instance 110 based on input received from users 145 and 155 of customers 140 and 145, respectively.

It will be assumed that customer A 140 corresponds to a first tenant of database instance 110 and that customer B 150 corresponds a second tenant of database instance 110. Upon receipt of input from a user 145 of customer A 140, multi-tenant application 130 may transmit a query to database instance 110 which indicates an association with the first tenant. Similarly, upon receipt of input from a user 145 of customer B 150, multi-tenant application 130 may transmit a query to database instance 110 along with an indication that the query is associated with the second tenant.

Accordingly, multi-tenant application 130 is able to determine the tenant which corresponds to a user from whom input is received. For example, each user may logon to multi-tenant application 130 using a tenant-specific subscription. Multi-tenant application 130 therefore associates a user with the tenant of the subscription under which the user has logged on. In another example, communications between users and multi-tenant application 130 may include tenant-identifying tokens.

Multi-tenant application 130 is also aware of which tenants are placed on which database instances. In this regard, multi-tenant application 130 may request provisioning of database instances and creation of tenants on provisioned database instances. Upon receiving input from a user associated with a given tenant, multi-tenant application 130 is able to determine the database instance which includes the given tenant and to which a corresponding query should therefore be directed.

Upon receipt of a query from multi-tenant application 130, database instance 110 processes the query using the artifacts (e.g., row store tables) which have been assigned to the particular tenant with which the query is associated. Each time a query received from an application consists of a transaction on data in memory 112, the transaction is logged as a log entry of a log segment stored within data 113. The pre-transaction version of the data page is stored as an undo data page, and the data page as changed by the transaction is marked as "dirty". Periodically, and as is known in the art, a savepoint is created by writing the dirty data pages and the corresponding undo data pages of data 113 to persistent storage 120.

Persistent storage 120 persists encrypted data of all assigned tenants. Persistent storage 120 may be implemented using any persistent data storage system that is or becomes known, including but not limited to distributed data storage systems. Persistent storage 120 includes data volume 122 and log volume 124.

According to some embodiments, the header of each page associated with a row store table includes an identifier which can be used to determine an associated encryption key. The associated encryption key is associated with a tenant to which the row store table is assigned. The associated encryption key may be a symmetric key used for both encryption and decryption, and will be referred to herein as a key or an encryption key regardless of whether it is being used to perform encryption or decryption. The encryption key may be stored among encryption keys 165 of local store 160.

Figure 3A:
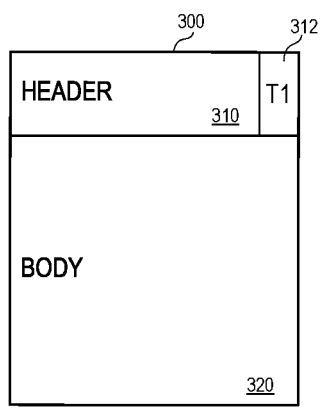
FIG. 3A illustrates an unencrypted data page including a tenant-identifying header portion according to some embodiments.

FIG. 3A is a conceptual illustration of unencrypted data page 300 according to some embodiments. Data page 300 may be stored in memory 112 and may comprise a data page of row store table data. Data page 300 is associated with a logical page number as is known in the art. Data page 300 may comprise an undo data page as described above. Data page 300 includes header 310 and body 320, with body 320 storing actual table data and header 310 storing metadata associated with the data of body 320.

Header 310 includes key-identifying header portion 312. Header portion 312 may store any information suitable for determining an encryption key which should be used to encrypt and decrypt the data of body 320. The information may comprise an identifier of a tenant (which in turn is associated with an encryption key by the metadata of database instance 110), of the key itself, or of another entity having a 1-to-1 relationship with the key. In some embodiments header portion 312 stores an eight-byte value.

Upon creation of a row store table within data 113, the key-identifying header portion 312 of each page of the table may be populated with an identifier of a database-specific key associated with database instance 110. If the row store table is then assigned to a tenant, the value of the identifier is updated to an identifier of the tenant (or of the key created for the tenant, for example). In some embodiments, a row store table is assigned to a tenant at its creation, in which case header portion 312 is initially populated with the identifier of the tenant (or associated key).

At a savepoint, and for each dirty and undo data page stored in memory 112, page management component 114 acquires the identifier in the header of the data page, determines an encryption key of encryption keys 165 based on the identifier, and uses the encryption key to encrypt the body of the data page. Page management component 114 then stores the data page including the unencrypted header and the encrypted body within data volume 122 of persistent storage 120.

Figure 3B:
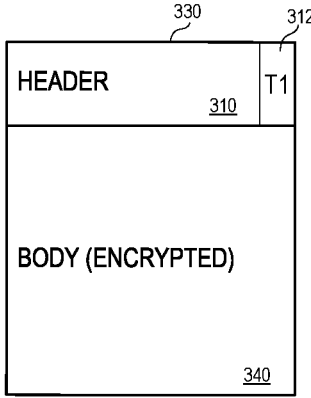
FIG. 3B illustrates an encrypted data page including a key-identifying header portion according to some embodiments.

FIG. 3B is a conceptual illustration of encrypted data page 330 according to some embodiments. Encrypted data page 330 is an encrypted version of page 300 of FIG. 3A and represents the same logical page number as page 300. For example, in order to store data page 300 in persistent storage, body 320 is encrypted using an encryption key identified by an identifier within header portion 312, resulting in encrypted body 340. Similarly, prior to loading stored data page 330 into memory 112 at restart, body 340 is decrypted using the encryption key identified by an identifier within header portion 312 of page 330, resulting in decrypted body 320. Advantageously, header 310 including the key identifier is never encrypted by a tenant-specific encryption key but is unencrypted or encrypted using a database instance-specific key, and can therefore always be read by database instance 110 in order to determine the key associated with data pages 300 and 330.

In some cases, the data page to be stored is not associated with any particular tenant and the identifier of its header indicates the data page is unassigned. To encrypt such a data page, page management component 114 determines an encryption key of encryption keys 165 which is associated with database instance 110, rather than with any specific tenant, and uses the encryption key to encrypt the body of the unassigned data page prior to storage within data volume 122. Accordingly, data volume 122 includes encrypted data pages and undo data pages of row store tables which are assigned to particular tenants and of row store tables which are not assigned to any particular tenant of database instance 110.

The encryption key associated with a given tenant may be generated and stored in store 160 upon creation of the given tenant. Similarly, the encryption key associated with database instance 110 may be generated at creation of database instance 110. A key page may store all the data encryption keys (DEKs) of each tenant, and the key page is encrypted with the database instance-specific encryption key (i.e., DEK DB). Similarly, all log entries are encrypted by default with a log root key (not shown). Accordingly, customer-specific keys are used to encrypt customer-specific data, and the database instance-specific key and the log root key are used to all other data.

Key management system 170 stores key encryption keys 175 received from a provider of database instance 110 and from customers 140, 150. For example, the database instance provider (not shown) provides a key encryption key (KEK) which is used to encrypt the database-specific key 165 of store 160. A key user 145 of customer A 140 provides a KEK to key management system 170 for use in encrypting the key 165 of store 160 which is specific to a tenant corresponding to customer A 140, and a key user 155 of customer B 150 provides a KEK to key management system 170 for use in encrypting the key 165 of store 160 which is specific to a tenant corresponding to customer B 150.

In order to decrypt persisted data 122, page management component 114 requests the corresponding (i.e., tenant-specific or database-specific) key from store 160. Since the corresponding key is stored in encrypted format, secure store 160 requests decryption of the encrypted key from key management system 170. In some embodiments, store 160 sends ciphertext of the encrypted key to key management system 170.

In response, key management system 170 decrypts the key using the KEK which was used to encrypt the key. For example, if the key required by page management component 114 is associated with the tenant of customer 140, then this key is decrypted by key management system 170 using the KEK associated with the tenant of customer 140 and stored in KEKs 175. The decrypted key is then returned to store 160 for use by page management component 114.

Accordingly, if customer A interacts with key management system 170 to revoke the KEK associated with the tenant of customer A 140, key management system 170 cannot decrypt the corresponding key of DEKs 165. Consequently, page management component 114 cannot decrypt data pages of data 122 which are associated with artifacts assigned to the tenant of customer A 140. Secure store 160 may thereafter decline all future requests from database instance 110 which refer to this tenant.

Store 160 may store one active key and zero or more inactive keys per tenant to support database snapshots. For example, at the beginning of a savepoint, database instance 110 fetches the active keys of all tenants from store 160 (after the keys have been decrypted using their corresponding KEKs), keeps the keys in memory, and uses the keys to encrypt data while writing the savepoint. At the start of a next savepoint, any changes to the active keys (e.g., via key rotation or key revocation) will be noticed. Database instance 110 stores a list of revoked keys in revoked keys 116.

If a tenant-specific key was revoked, then the tenant may be marked as disabled, the data that is assigned to this tenant is unloaded from memory 112, and the data may be physically removed from storage 120. Application 130 will therefore receive an error if it attempts to access data of a disabled tenant and, in response, will clean up its own tables respective to this tenant and call a procedure to remove all of the tenant's data from storage 120.

In some embodiments, secure store 160 polls key management system 170 to determine whether any KEKs have been revoked. To avoid hundreds of polls arising from one local secure store installation supporting hundreds of tenants, key management system 170 may provide a grouping mechanism that allows secure store 160 to acquire KEK updates for all of its tenants using a few calls. Similarly, database instance 110 polls secure store 160 to determine whether the KEKs of any of its tenants have been revoked. Since revocation of a KEK associated with a tenant prevents usage of the key of keys 165 which corresponds to the tenant, revoked keys 116 may also list such tenant-specific keys.

Logger component 115 writes a log entry to log volume 124 for each committed transaction during runtime operation of database instance 110. Such a log entry is referred to as a redo log entry and is associated with a transaction on one row store table. A redo log entry may include header information such as a start time of the transaction and an indicator of whether the transaction was committed or aborted, and also includes the updated table data resulting from the transaction.

Each log entry may also include an identifier which can be used to determine an key of encryption keys 165. Each time logger 115 is to save a log entry in log volume 124 logger 115 acquires the identifier of the log entry, determines an encryption key 165 based on the identifier, and uses the encryption key to encrypt the updated table data of the log entry. Logger 115 then stores the log entry including the unencrypted header information and the encrypted updated table data within log volume 124.

Database instance 110 thereby provides a single data server including the data and metadata of all tenants of database instance 110, the engines for processing the data, and a single persistence for the data and metadata. Hosting multiple independent tenants on such a single database instance facilitates sharing of computing resources at near-zero marginal cost.

Figure 4A:
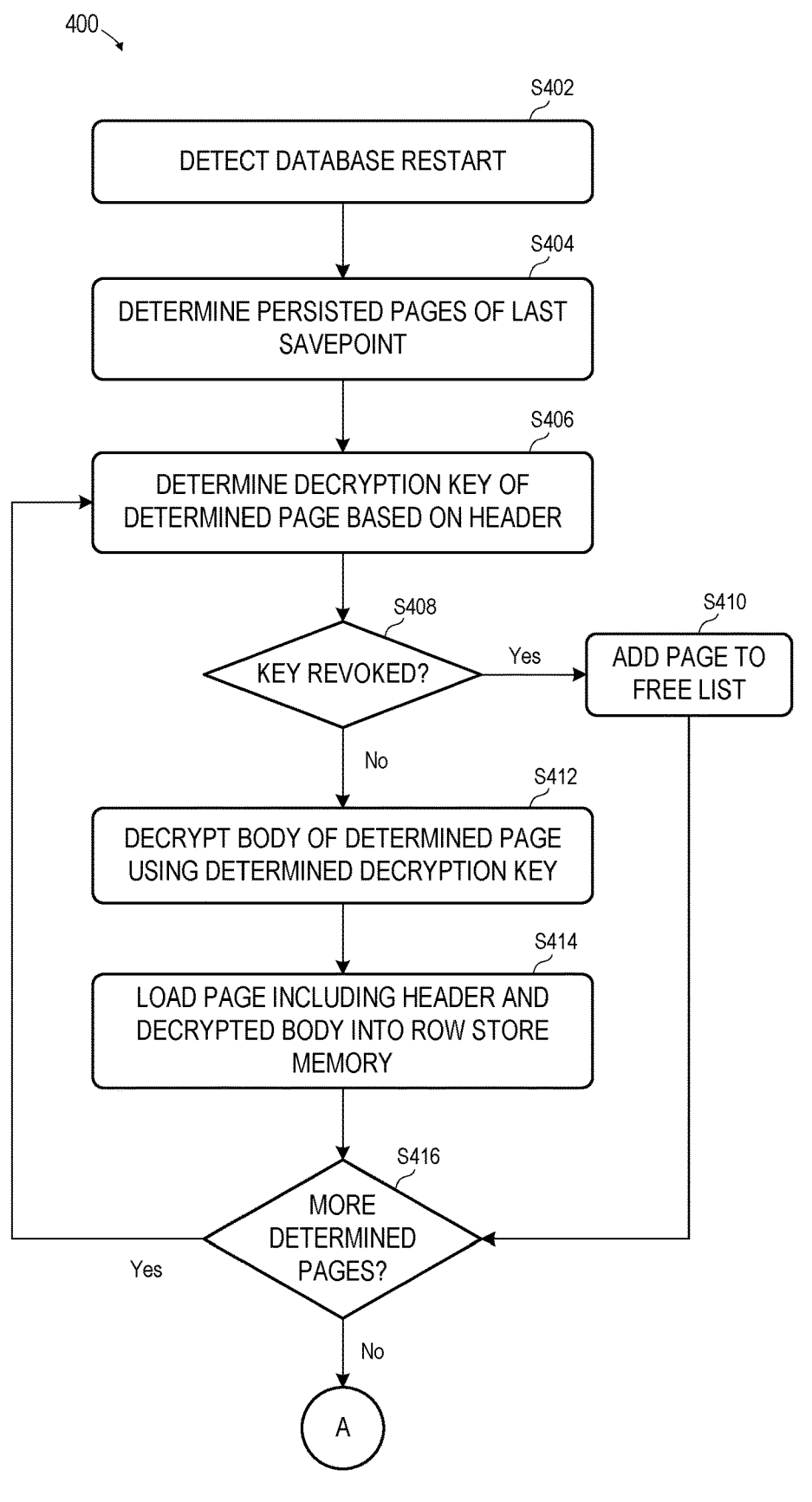
FIGS. 4A and 4B include a flow diagram of a restart process for handling tenant-specific key revocation according to some embodiments.
Figure 4B:
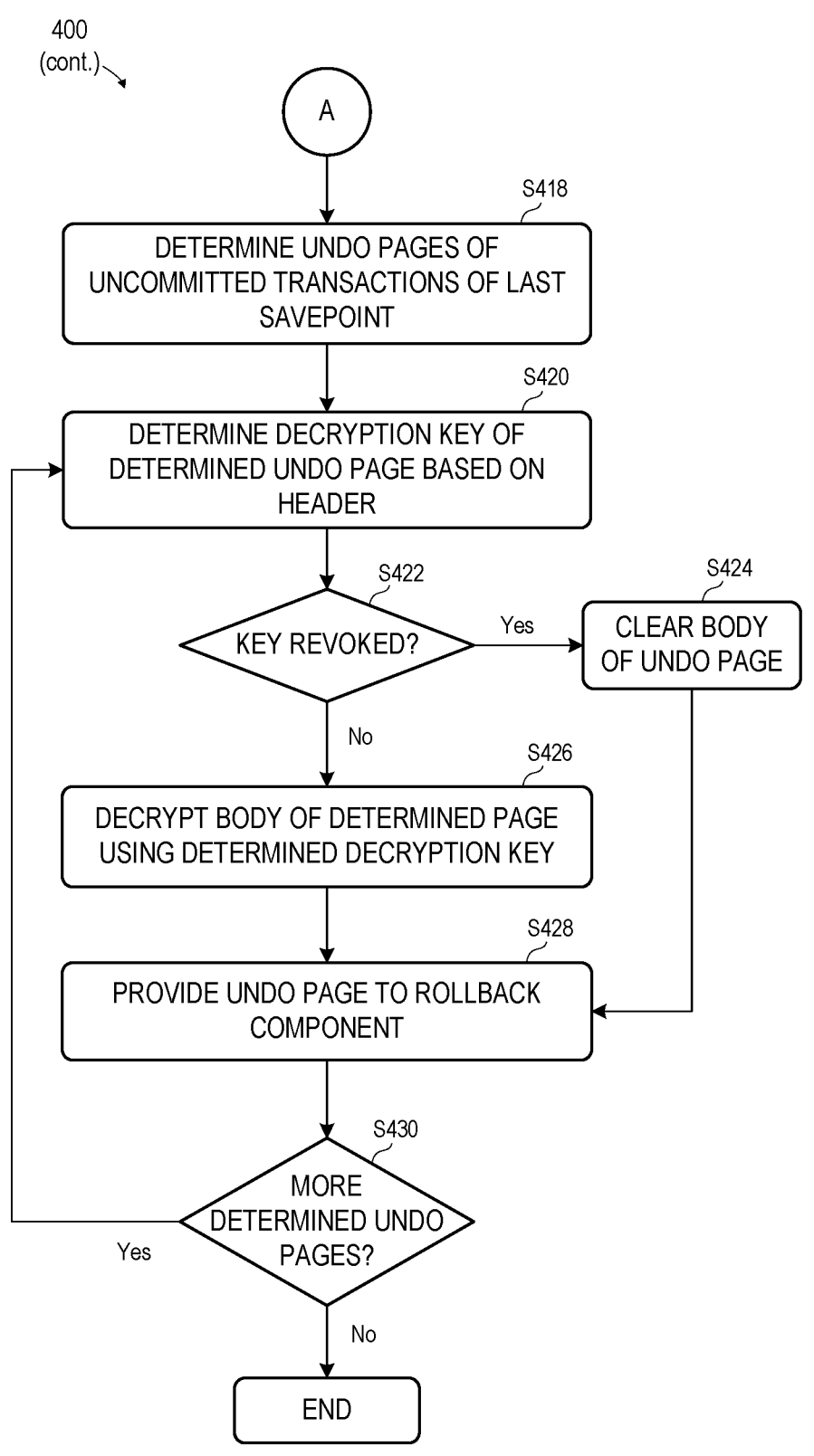

FIGS. 4A and 4B show a flow diagram of a restart process for handling tenant-specific key revocation according to some embodiments. Process 400 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A database restart is detected at S402 and, in response, the persisted pages of a last savepoint are determined at S404. In some embodiments, page management component 114 determines the row store table data pages of the last savepoint from data volume 122 at S404. Since the body of each data page is stored in data volume 122 in encrypted format, it is necessary to decrypt the body of each data page prior to loading the data pages to memory 112.

Accordingly, a decryption key for one of the determined data pages is determined at S406. Page management component 114 may use an identifier in the header of the data page to identify a key of keys 165 at S406 as described above. Next, it is determined at S408 whether the key has been revoked. Revocation of a data decryption key may comprise removal of the key from store 160 or revocation of its corresponding KEK from key management system 170. The determination at S408 may comprise determining whether the key is listed in revoked keys 116 which, as mentioned above, may be populated by polling key management system 170 and secure store 160.

If the key has been revoked, the data page is added to the free list of memory 112 at S410. Accordingly, the region of memory 112 which was allocated for the data page is now free to be used by database instance 110. Flow then proceeds to S416.

If the key has not been revoked, page management component 114 may decrypt the body of the data page at S412 using the determined key as described above. Next, at S414, the data page including the header and the decrypted body are loaded into memory 112. Loading of the data page into memory 112 may include rebuilding links between data pages of an artifact (e.g., a row store table) to which the data page belongs so that the artifact can be efficiently scanned during runtime operation.

Flow returns from S416 to S406 if other determined data pages remain to be decrypted and loaded into memory. Accordingly, flow cycles among S406 through S416 until all the data pages determined at S404 have been processed. Embodiments are not limited to serially decrypting and loading each data page as described above. For example, a batch of data pages (e.g., data pages to be decrypted using a same key or data pages to be released to the free list) may be decrypted/released in parallel. Flow proceeds to S418 after all the determined data pages have been processed.

At S418, the undo data pages stored in data volume 122 at the last savepoint and associated with uncommitted transactions are identified. Page management component 114 uses the identifier in the header of each undo data page to identify a corresponding decryption key at S420.

It is then determined at S422 whether the key has been revoked. If so, the encrypted body of the undo is cleared at S424 and flow proceeds to S428. If the key of the undo page has not been revoked, the key is used to decrypt the body of the undo data page at S426.

At S428, the determined undo page (i.e., either cleared at S424 or decrypted at S426) is provided to a rollback mechanism of database instance 110. As is known in the art, the rollback mechanism rolls back the uncommitted transactions to the states represented by the decrypted undo data pages. In the case of the cleared undo pages, the rollback mechanism does not modify data 113 because to prior transaction state is identified in the cleared undo pages.

Flow returns from S430 to S420 if other determined undo data pages remain to be processed. Flow therefore cycles between S420 through S430 until all the determined undo data pages have been provided to the rollback mechanism. Again, a plurality of determined undo data pages may be batch-processed at S424, S426 and/or 428.

Figure 5:
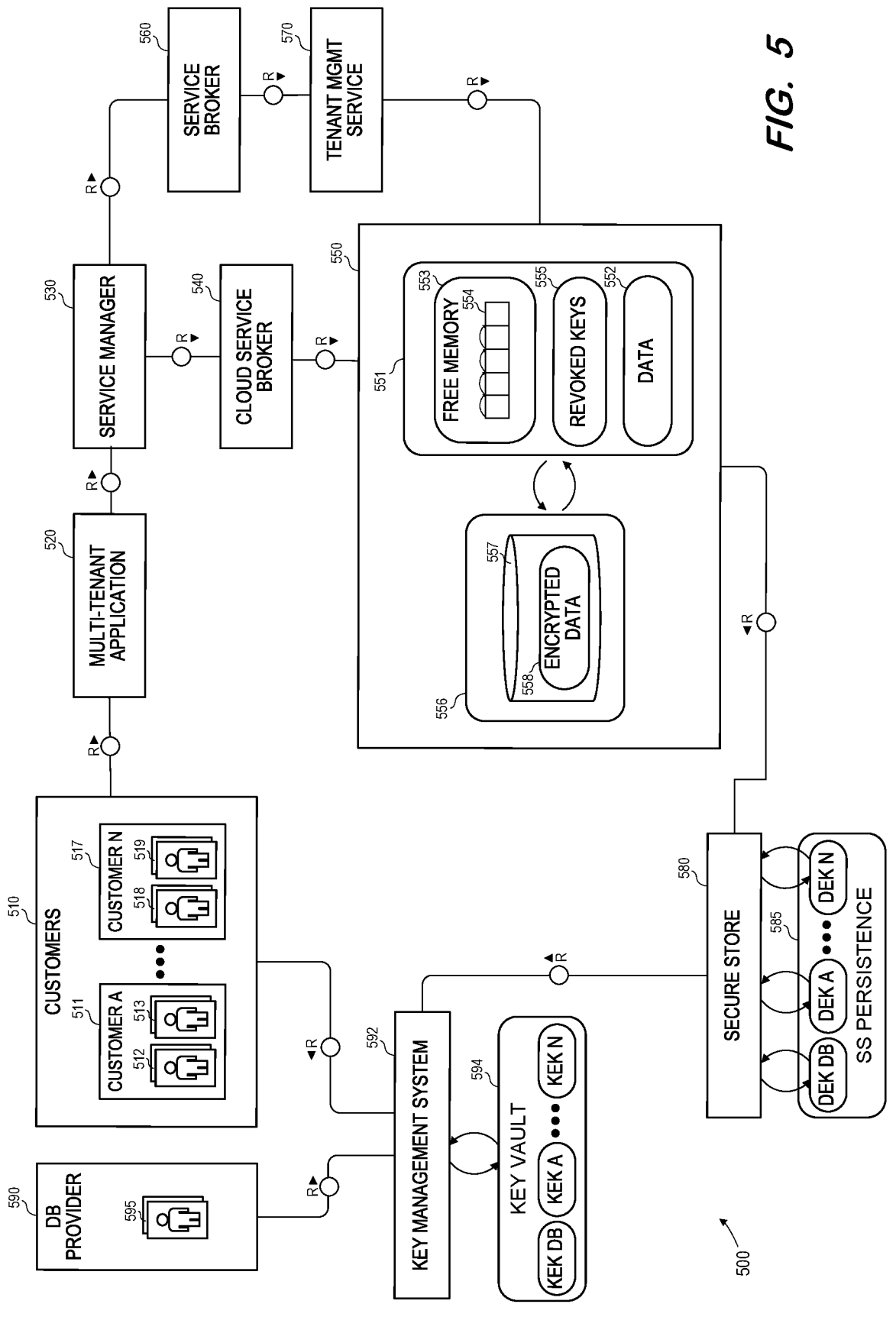
FIG. 5 is a block diagram of a database system providing native multi-tenancy and tenant-level encryption according to some embodiments.

FIG. 5 is a block diagram of a database system providing native multi-tenancy and tenant-level encryption according to some embodiments. Database instance 550 stores data 552 within volatile memory 551 as described above with respect to data 113 and memory 112. Volatile memory also includes free memory 553 including free list 554 and list of revoked keys 555 as described above.

Each tenant instance of database instance 550 corresponds to a respective one of customers 510. Customer A 511 includes key users 512 and business users 513, and customer N 517 includes key users 518 and business users 519. In some examples, a key user 512 may access multi-tenant application 520 to request provisioning of a database instance. This request is forwarded to service manager 530 and to cloud service broker 540. Cloud service broker 540 then provisions database instance 550 as a cloud-based resource.

A tenant object instance may then be created in the database instance. Continuing the above example, a key user 512 may access multi-tenant application 520 to request creation of a tenant on database instance 550. This request is forwarded to service manager 530, to service broker 560, and to tenant management service 570. Tenant management service 570 then instructs database instance 550 to create an instance of tenant A based on a tenant object defined in metadata of data 552. The instance of tenant A may be identified by a tenant ID which is known to database instance 550 and multi-tenant application 520.

Multi-tenant application 520 may then request tenant management service 570 to instruct database instance 550 to assign selected artifacts (e.g., row store database tables) of data 552 to tenant A. In this regard, the key user 512 may have previously operated multi-tenant application 520 and service broker 560 to define these artifacts within data 552 of database instance 550. The headers of the data pages of a previously-defined row store table may include an identifier identifying a database-specific (i.e., not tenant-specific) encryption key. If the row store table is then assigned to tenant A as described above, the identifier of each data page of the row store table is changed to an identifier identifying an encryption key specific to tenant A.

Some embodiments may use a deployment infrastructure to define database artifacts to assign to a tenant instance. The deployment infrastructure may provide a declarative approach for defining database objects (e.g., as design-time artifacts) using containers. For example, service broker 560 may create a container which corresponds to a database schema and additional metadata (e.g., user, roles, privileges) which may then be assigned to a tenant instance. Such containers may be isolated from each other by schema-level access privileges. Application 520 can access any database object in the database schema of the container by using an assigned per-schema technical database user.

A key user 518 of customer N 517 may also access multi-tenant application 520 to request creation of a tenant on database instance 550. This request is forwarded to service manager 530, to service broker 560, and to tenant management service 570, which instructs database instance 550 to create an instance of tenant N in data 552. Multi-tenant application 520 further instructs tenant management service 570 to assign previously-defined artifacts to the tenant N instance. Again, the headers of the data pages of such artifacts are updated to identify an encryption key specific to tenant N.

After provisioning database instance 550 and creating tenants A and N, multi-tenant application 520 may, for example, receive input from a business user 513 of customer A 511. In response, application 520 directs any resulting queries to database instance 550 via tenant management service 570 along with an identifier of tenant A. Database instance 550 therefore responds to the queries based on artifacts assigned to tenant instance A. In a case that multi-tenant application 520 receives input from a business user 519 of customer N 517, any resulting queries are directed to database instance 550 and responded to based on artifacts assigned to tenant instance N.

Persistence 556 may be implemented using any suitable storage system or systems. Data volume 557 of persistence 556 stores encrypted data 558 of all database objects which are assigned to a tenant and those which are not assigned to a particular tenant. Tenant-specific data 558 is encrypted using DEKs which are specific to their corresponding tenant (e.g., DEK A and DEK N), and data 558 which is not specific to any tenant is encrypted using a DEK which is specific to database instance 550 (e.g., DEK DB). According to some embodiments, DEK DB is a symmetric key generated during creation of database instance 550 and tenant-specific keys DEK A and DEK N are symmetric keys generated during creation of tenants A and N, respectively.

In some embodiments, the keys are stored in persistence 585 of secure store 580 in encrypted form. For example, a key user 595 of database instance provider 590 provides KEK DB to key management system 592 for storage in key vault 594. KEK DB is used to encrypt DEK DB prior to storage thereof in secure store persistence 585. KEK DB may also comprise a symmetric key.

Accordingly, database instance 550 requests DEK DB from secure store 580 when database instance 550 wishes to decrypt tenant-unassigned data pages, such as during a restart process. In response, secure store 580 requests key management system 592 to decrypt DEK DB using KEK DB. Database instance 550 then uses DEK DB to decrypt the desired tenant-unassigned data pages.

Similarly, a key user 512 of customer A 511 provides KEK A to key management system 592 for storage in key vault 594. KEK A is used to encrypt DEK A prior to storage thereof in secure store persistence 585. Database instance 550 may request DEK A from secure store 580 in order to decrypt data pages of data 558 which are associated with tenant A, in order to load thusly-decrypted pages into data 552. In one example, the headers of such data pages include an identifier identifying tenant A, and database instance 550 is aware that tenant A is associated with DEK A. In response to the request, secure store 580 requests key management system 592 to decrypt DEK A using KEK A. The request may be issued to an account of key management system 592 which is specific to customer A 511. Database instance 550 then uses the decrypted DEK A to decrypt the desired data of data 558.

In some embodiments, secure store 580 polls key management system 592 to determine whether any KEKs have been revoked. Database instance 550 also polls secure store 580 to determine whether the KEKs of any of its tenants have been revoked and records such revocations in revoked keys 555. Accordingly, during the loading of a data page from data 558 to data 552, it is determined whether a decryption key required to decrypt the page is represented in revoked keys 555. If so, the data page is not decrypted or loaded, but its corresponding memory region is added to free list 554 of free memory 553.

Figure 6:
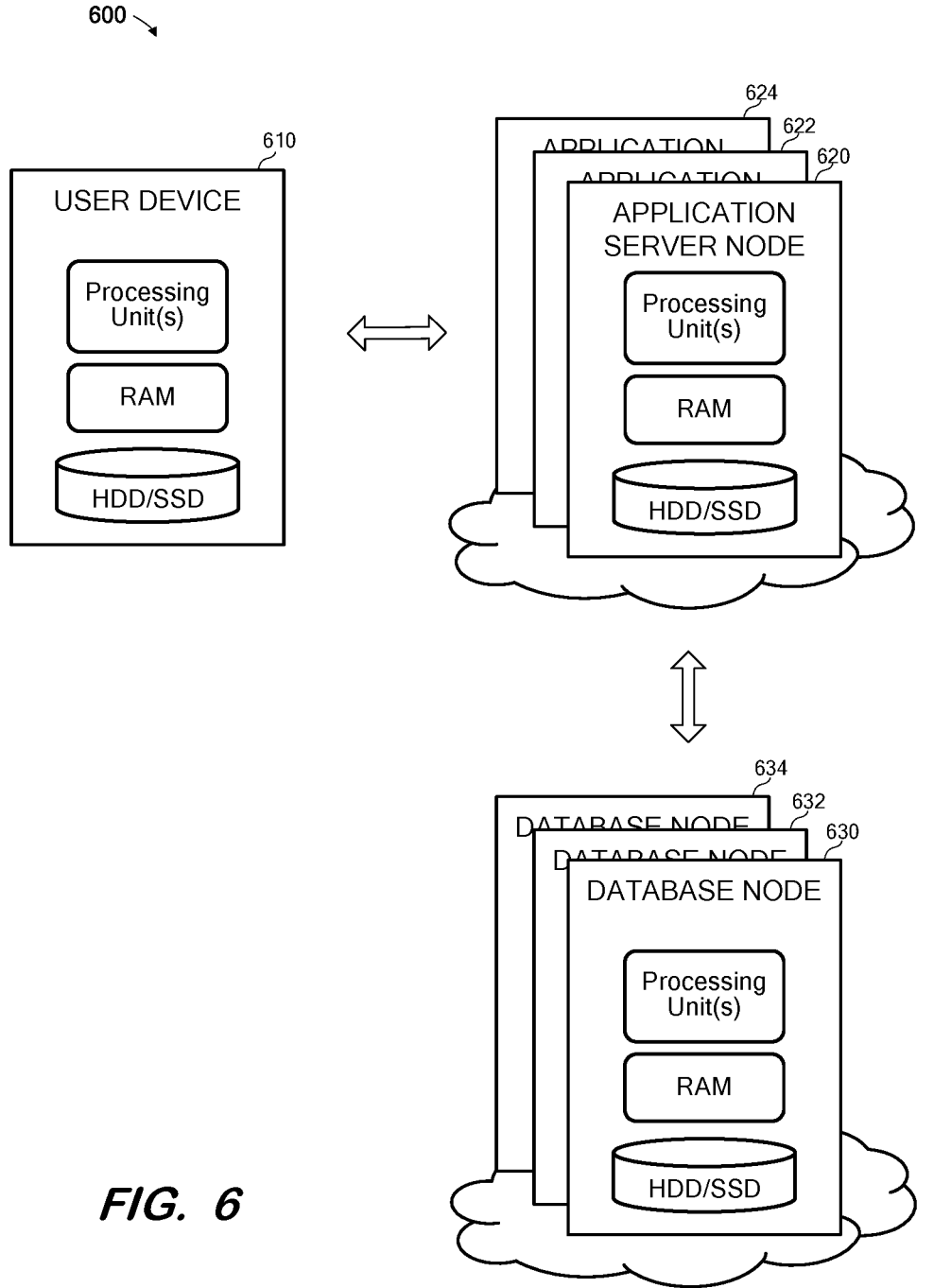
FIG. 6 is a block diagram of a cloud-based system according to some embodiments.

FIG. 6 is a block diagram of cloud-based database deployment 600 according to some embodiments. User device 610 may comprise any suitable computing system operable by a key user or a business user to access a cloud-based multi-tenant application. User device 610 may store and execute program code of a Web browser to access a Uniform Resource Locator (URL) associated with a login page of such a multi-tenant application. The Web browser may download and execute program code of a client-side component of a multi-tenant application as is known in the art.

Application server nodes 620, 622 and 624 may host a multi-tenant application according to some embodiments. Database nodes 630, 632 and 634 may host one or more database instances accessible to the multi-tenant application and providing native multi-tenancy as described herein. Each node of deployment 600 may comprise a separate physical machine or a virtual machine. Such virtual machines may be allocated by a cloud provider providing self-service and immediate provisioning, autoscaling, security, compliance and identity management features.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
a persistent storage system;
a volatile memory; and
a processing unit to execute program code of a database instance to cause the database system to:
    store a plurality of encrypted data pages of a row store database table at a database savepoint;
    detect a database restart and, in response to detection of the database restart:
    determine, based on a header of one of the plurality of encrypted data pages, a first encryption key used to encrypt a body of the one of the plurality of data pages;
    determine that the first encryption key has been revoked;

in response to the determination that the first encryption key has been revoked, add a portion of the volatile memory allocated to the one of the plurality of data pages to a free list of the volatile memory;

determine a plurality of encrypted undo data pages of uncommitted transactions of the database savepoint in the persistent storage system;

determine, based on a header of one of the plurality of encrypted undo data pages, a third encryption key used to encrypt a body of the one of the plurality of encrypted undo data pages;

determine that the third encryption key has been revoked; and in response to the determination that the third encryption key has been revoked, clear a body of the one of the plurality of encrypted undo data pages and provide the one of the plurality of undo data pages with the cleared body to a rollback mechanism of a database instance.

2. A system according to claim 1, wherein the processing unit is to execute program code of the database instance to cause the database system to:

determine, based on a second header of a second one of the plurality of encrypted data pages, a second encryption key used to encrypt a second body of the second one of the plurality of data pages;

determine that the second encryption key has not been revoked;

in response to the determination that the second encryption key has not been revoked, decrypt the second body of the second one of the plurality of data pages using the second encryption key; and load a second data page comprising the second header and the second decrypted body in the volatile memory.

3. A system according to claim 2, wherein determination that the first encryption key has been revoked comprises determination that a key encryption key used to encrypt the first encryption key has been revoked.

4. A system according to claim 3, wherein determination that the key encryption key used to encrypt the first encryption key has been revoked comprises polling of a key management system storing the key encryption key.

5. A system according to claim 1, wherein determination that the first encryption key has been revoked comprises determination that a key encryption key used to encrypt the first encryption key has been revoked.

6. A system according to claim 5, wherein determination that the key encryption key used to encrypt the first encryption key has been revoked comprises polling of a key management system storing the key encryption key.

7. A method comprising:

storing a plurality of encrypted data pages of a row store database table in a persistent storage system at a database savepoint;

detecting a database restart and, in response to detecting the database restart:

determining, based on a header of one of the plurality of encrypted data pages, a first encryption key used to encrypt a body of one of the plurality of encrypted data pages;

determining that the first encryption key has been revoked;

in response to determining that the first encryption key has been revoked, adding a portion of volatile memory allocated to the one of the plurality of data pages to a free list;

determining a plurality of encrypted undo data pages of uncommitted transactions of the database savepoint in the persistent storage system;

determining, based on a header of one of the plurality of encrypted undo data pages, a third encryption key used to encrypt the one of the plurality of encrypted undo data pages;

determining that the third encryption key has been revoked; and in response to determining that the third encryption key has been revoked, clearing a body of the one of the plurality of encrypted undo data pages and providing the one of the plurality of undo data pages with the cleared body to a rollback mechanism of a database instance.

8. A method according to claim 7, further comprising:

determining, based on a second header of a second one of the plurality of encrypted data pages, a second encryption key used to encrypt a second body of the second one of the plurality of data pages;

determining that the second encryption key has not been revoked;

in response to determining that the second encryption key has not been revoked, decrypting the encrypted second body of the second one of the plurality of encrypted data pages using the second encryption key; and loading a second data page comprising the second header and the decrypted second body into the volatile memory.

9. A method according to claim 8, wherein determining that the first encryption key has been revoked comprises determining that a key encryption key used to encrypt the first encryption key has been revoked.

10. A method according to claim 9, wherein determining that the key encryption key used to encrypt the first encryption key has been revoked comprises polling a key management system storing the key encryption key.

11. A method according to claim 7, wherein determining that the first encryption key has been revoked comprises determining that a key encryption key used to encrypt the first encryption key has been revoked.

12. A method according to claim 11, wherein determining that the key encryption key used to encrypt the first encryption key has been revoked comprises polling a key management system storing the key encryption key.

13. A non-transitory computer-readable medium storing program code executable by one or more processing units to cause a computing system to:

store a plurality of encrypted data pages of a row store database table in a persistent storage system at a database savepoint;

detect a database restart and, in response to detection of the database restart:

determine, based on a header of one of the plurality of encrypted data pages, a first encryption key used to encrypt a body of one of the plurality of encrypted data pages;

determine that the first encryption key has been revoked;

in response to the determination that the first encryption key has been revoked, add a portion of volatile memory allocated to the one of the plurality of data pages to a free list;

determine a plurality of encrypted undo data pages of uncommitted transactions of the database savepoint in the persistent storage system;

determine, based on a header of one of the plurality of encrypted undo data pages, a third encryption key used to encrypt the one of the plurality of encrypted undo data pages;

determine that the third encryption key has been revoked; and in response to the determination that the third encryption key has been revoked, clear a body of the one of the plurality of encrypted undo data pages and provide the one of the plurality of undo data pages with the cleared body to a rollback mechanism of a database instance.

14. A medium according to claim 13, the program code executable by one or more processing units to cause a computing system to:

determine, based on a second header of a second one of the plurality of encrypted data pages, a second encryption key used to encrypt a second body of the second one of the plurality of data pages;

determine that the second encryption key has not been revoked;

in response to the determination that the second encryption key has not been revoked, decrypt a second body of the second one of the plurality of encrypted data pages using the second encryption key; and load a second data page comprising the second header and the decrypted second body into the volatile memory.

15. A medium according to claim 14, wherein determination that the first encryption key has been revoked comprises determination that a key encryption key used to encrypt the first encryption key has been revoked.

16. A medium according to claim 15, wherein determination that the key encryption key used to encrypt the first encryption key has been revoked comprises polling of a key management system storing the key encryption key.

17. A medium according to claim 13, wherein determination that the first encryption key has been revoked comprises determination of whether a key encryption key used to encrypt the first encryption key has been revoked.

* * * * *